(No Model.)
W. A. BREMER.
TUNING HAMMER.
No. 535,482.  Patented Mar. 12, 1895.
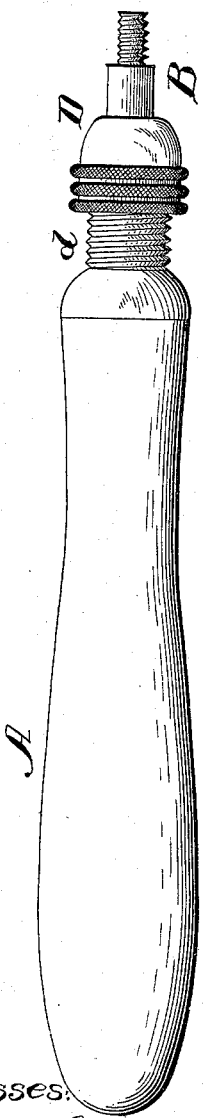
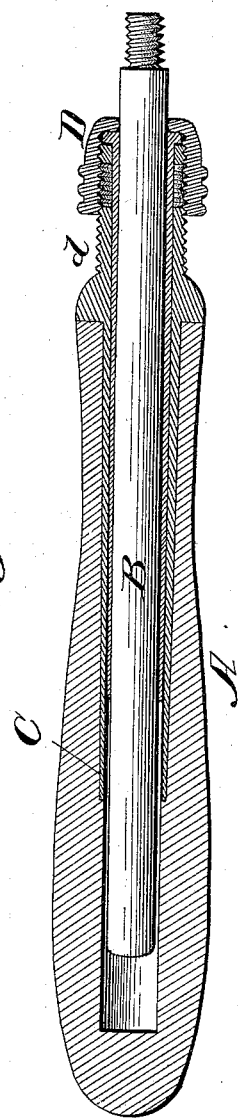
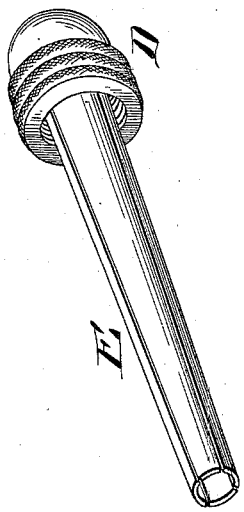
Witnesses:
J. B. McGiee.
H. Ricketts.
Inventor:
William Aloise Bremer,
per M. L. Moran,
Attorney.
THE NORRIS PETERS CO., PHOTO-LITHO., WASHINGTON, D. C.

UNITED STATES PATENT OFFICE.

WILLIAM ALOISE BREMER, OF NEW ORLEANS, LOUISIANA.

TUNING-HAMMER.

SPECIFICATION forming part of Letters Patent No. 535,482, dated March 12, 1895.

Application filed July 30, 1894. Serial No. 518,941. (No model.)

*To all whom it may concern:*

Be it known that I, WILLIAM ALOISE BREMER, a citizen of the United States of America, residing at New Orleans, in the parish of Orleans and State of Louisiana, have invented certain new and useful Improvements in Tuning-Hammers, of which the following is a specification, reference being had therein to the accompanying drawings.

This invention relates to tuning hammers and has for its object to provide an instrument which will at all times when in use, hold the rod or stem perfectly firm and prevent any movement thereof in the handle either rotary, sliding or bending.

With this object in view the invention consists in a certain construction and arrangement of parts as hereinafter described and claimed.

In the drawings—Figure 1, is a view of the instrument complete. Fig. 2, is a longitudinal section of the same. Fig. 3, shows a perspective view of the chuck.

A, represents the hollow handle of the hammer and B, is the rod which slides in the hollow portion and is adapted to be securely set at any point. The opening in the handle is provided with a metal lining or tube C, which is nicely turned and of a little larger diameter at its outer end than at its inner end. The outer end of the lining is also provided with an outside screw thread as shown at, *d*, and adapted to receive the hollow nut D. The chuck as shown at Fig. 3, consists of the wedge tube E, securely fastened into the head of the hollow nut D, and yet so connected that the nut D, is always free to turn about the wedge tube. This wedge tube is split along its entire length and preferably into four parts as shown. The tube is also made tapering, that is, the metal is thinner at the inner end than at the outer, thus forming a long thin wedge.

The rod B is of uniform diameter and smaller than the hollow lining of the handle but just fits the opening in the outer end of the hollow nut D and the interior of the split wedge tube E. When the tube with the inclosed rod is inserted into the hollow handle and the nut D engages the threaded portion *d*, of the lining, the tapering wedge tube is forced with great pressure between the interior of the smooth lining and the rod B thus holding it perfectly steady and firm.

In this class of devices it is essential that there should not be the slightest play or looseness between the rod B and the handle in order that the operator may be certain as to the amount of adjustment of the pins while tuning an instrument. For this reason, devices, which have set screws to secure the rod or a tapered threaded nut on a split threaded sleeve, are found to be inadequate since there is always a certain amount of spring or twisting which deceives the operator. In the hammer herein described the action is entirely different. As the split wedge tube is forced between the rod and metal lining of the handle, it operates on the principle of the wedge and creates a great pressure on all sides of the rod which is also distributed throughout the whole length of the bearing surface of the tube. This is an important feature as the rod is held evenly and securely throughout the greater portion of its length, and all twisting or motion of any kind is wholly prevented.

Having thus described my invention, what I claim is—

1. A tuning hammer comprising a hollow handle the rod therein and the wedge tube adapted to be forced in around the rod substantially as described.

2. A tuning hammer comprising the hollow handle with the tubular metal lining the rod adjustable in said handle and the wedge tube adapted to be forced between the rod and the tubular lining of the handle substantially as described.

3. In a tuning hammer the hollow handle provided with the tapering tubular metal lining the rod therein and the split wedge tube adapted to be forced between the rod and handle lining, whereby the rod may be clamped in any position.

4. In a tuning hammer the hollow handle provided with a tapering lining, the rod therein and the wedge piece E, adapted to be forced between the rod and lining substantially as described.

5. In a tuning hammer, the hollow handle provided with a tapering metal lining, the rod B, the split wedge tube E, fitting the interior taper of the lining and adapted to be forced between the rod and lining whereby a continuous bearing is obtained throughout the entire length of the wedge tube substantially as described.

6. In a tuning hammer the hollow handle provided with the metal lining, the rod B, the split wedge tube E, and the hollow nut D connected with the tube and adapted to engage with the screwthreaded portion of the handle whereby the wedge tube may be forced in between the rod and the interior lining substantially as described.

In testimony whereof I affix my signature in presence of two witnesses.

WILLIAM ALOISE BREMER.

Witnesses:
FRANK ZENGEL,
H. L. LOOMIS, Jr.